3,270,072
INHIBITED CUMENE
Joseph Pesacreta, Jr., Fishkill, N.Y., assignor to Texaco Inc., New York, N.Y., a corporation of Delaware
No Drawing. Filed Sept. 9, 1965, Ser. No. 486,198
6 Claims. (Cl. 260—666.5)

This invention relates to inhibited cumene and to a method of inhibiting the autooxidation of commercial high purity cumene. In particular, this invention relates to the use of phenol to substantially prevent the formation of undesirable degradation products in cumene during prolonged storage in vented tankage.

It is an object of this invention to prevent the autooxidation of cumene to cumene hydroperoxide.

Another object is to maintain cumene in a sufficiently high degree of purity to obviate a feed preparation step in the cumene hydroperoxide process for producing phenol and acetone.

A further object is to prevent the formation of degradation products in cumene.

Still another object is to maintain cumene in a high degree of purity for prolonged periods in outdoor vented storage tanks.

These and other objects of this invention are accomplished by adding trace quantities of phenol to cumene. Although small quantities of phenol will inhibit the formation of cumene hydroperoxide in cumene, I have found that for maximum effectiveness, the addition of the phenol must be made before the cumene is brought in contact with air or before cumene hydroperoxide forms to any appreciable degree. I have also found that although phenols and amines are known anti-oxidants and will inhibit the degradation of cumene, phenol is not only superior to these other well known anti-oxidants such as, 2,6-ditertiarybutyl-4-methylphenol, but is actually the preferred anti-oxidant where the cumene will subsequently serve as a feedstock in the hydroperoxide cleavage process for producing acetone and phenol. Although other anti-oxidants are able to adequately and satisfactorily prevent the oxidataion of cumene, they often must be removed before the cumene may serve as a feed supply for the phenol production process.

Cumene (isopropylbenzene) was produced in large quantities during World War II for use as a blending agent for 100 octane gasoline. More recently, it has become an important intermediate in the production of phenol. Cumene may be produced by the alkylation of benzene with propylene, phosphoric acid-kieselguhr or $AlCl_3$ serving as a catalyst. Alternately, benzene may be alkylated with n-propyl bromide, isopropyl bromide or mixtures thereof with $AlCl_3$ as the catalyst to produce cumene.

When exposed to the atmosphere, hydrocarbons often deteriorate through oxidation. This process, called autooxidation, is a free radical reaction to which hydrocarbons having a tertiary hydrogen are particularly susceptible. The cumene molecule,

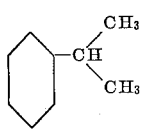

is especially subject to air oxidation since it contains a hydrogen atom that is not only tertiary but which is further activated by the unsaturated benzene ring. This autooxidation may be initiated thermally or by such catalysts as peroxides or azo compounds. Once underway, the reaction is autocatalytic since the oxidation product, a hydroperoxide, is itself a free radical initiator. One chain mechanism suggested is:

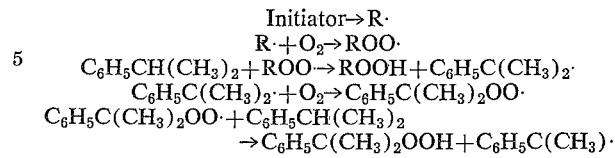

Free radical intermediates are found not only in air oxidation of hydrocarbons but in certain types of polymerization, as for example, vinyl polymerization. It is known that both of these reactions are chain reactions which may be accelerated by initiators or inhibited by free radical scavengers. Quinones and nitro compounds are well known inhibitors which will terminate or reduce the rate of a vinyl polymerization by adding radicals which in turn form new radicals which are not sufficiently reactive to propagate the polymerization reaction. However, when these particular materials are added to a hydrocarbon having a tertiary hydrogen atom, they have no effect at all in inhibiting air oxidation. Amines and phenols, on the other hand, are well known as effective antioxidants. The character of the respective inhibition reactions has been suggested as explaining the specificity of these materials—quinones and nitro compounds are thought to destroy hydrocarbyl radicals in the polymerization, while the phenols and amines react with the peroxy radicals, (ROO), to terminate or reduce the rate of air oxidation.

Cumene hydroperoxide,

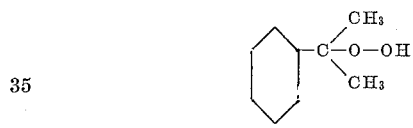

the principal product formed by the oxidation of cumene, will as discussed above, initiate further oxidation of cumene. In addition, this compound is relatively unstable, decomposing to form α-methylstyrene, acetophenone, α,α-dimethylphenyl carbinol, phenol and other decomposition products.

To produce phenol and acetone, cumene feed is oxidized under controlled conditions to form cumene hydroperoxide with a trace of sodium hydroxide added to the cumene prior to air blowing to prevent decomposition of the sensitive hydroperoxide. Cleavage of the cumene hydroperoxide is then accomplished under acid catalysis to form phenol and acetone. The cumene feed to the oxidation step must be of extremely high purity as small quantities of such materials as phenol, α-methylstyrene and acetophenone are known to interfere with the formation of cumene hydroperoxide. The presence of these materials in more than trace amounts necessitates a somewhat involved processe of purification of the cumene.

When produced by the alkylation of benzene, cumene may be recovered with a purity exceeding 99% which makes this aromatic compound an ideal feed stock for the cumene hydroperoxide cleavage process. However, if cumene is stored for prolonged periods in vented tankage, autooxidation will form cumene hydroperoxide and its subsequent degradation products thereby rendering the cumene unsatisfactory as a feed stock for the hydroperoxide cleavage process without an initial purification step. Cumene stored for two to three weeks in outdoor vented tankage frequently is below feedstock purity requirements because of oxidation degradation products.

By employing the method of my invention, the purification problems resulting from prolonged storage of cumene may be eliminated. I have found that if cumene contains phenol in concentrations below 100 p.p.m. but above 20 p.p.m., the phenol concentration is sufficiently low so as not to interfere with the controlled oxidation step in the hydroperoxide cleavage process, but will nonetheless prevent the undesirable formation of cumene hydroperoxide and its subsequent decomposition products during the storage of cumene in vented tankage for periods as long as several months. To obtain the maximum effectiveness of the inhibitor, I have found, and this is the essence of my invention, that the phenol must be introduced into the cumene shortly after the cumene is produced or at least before the concentration of cumene hydroperoxide reaches a substantial level. It is thought that the oxidation of cumene is initiated as soon as it is exposed to air. Once the oxidation product, cumene hydroperoxide, forms in an appreciable amount, this reaction becomes autocatalytic and addition of phenol at this time, while prolonging the permissive storage time somewhat, will be substantially less effective than if the phenol were added before the air oxidation becomes a chain reaction. I have found that phenol in concentrations as low as 30 p.p.m. if added to cumene before the cumene hydroperoxide concentration reaches 10 p.p.m. will inhibit the autooxidation of cumene. Accelerated storage tests indicate that cumene under these conditions can be stored in vented tankage outdoors for periods of 8–12 months without any appreciable autooxidation which would prohibit the use of this material as a satisfactory feed stock for the cumene hydroperoxide cleavage process. Increasing the concentration of phenol to 100–130 p.p.m., while increasing the permissive storage time somewhat, does not add significantly to the storage time so as to warrant this additional use of phenol. Deferring the phenol inhibition until cumene hydroperoxide forms in sufficient quantity to catalyze the cumene oxidation, significantly reduces the permissive storage time. For example, 30 p.p.m. of phenol added to cumene when the hydroperoxide concentration is approximately 60 p.p.m. limits the storage time to less than eight months; a like quantity of phenol will satisfactorily inhibit cumene having a hydroperoxide concentration of approximately 150 for less than four months while 30 p.p.m. of phenol will inhibit 225 p.p.m. hydroperoxide-containing cumene for less than two months. It is therefore necessary to inhibit the cumene shortly after it is pumped from the purification or recovery section of the cumene producing unit.

The phenol addition may be made by any convenient means well known in the art, such as manually adding the inhibitor to storage tankage and mixing the contents of the tank by means of a mixer or a pump, or alternately, a metering pump may be utilized to introduce the exact quantity of phenol into the tank. One preferred method is to introduce the phenol into the product rundown lines leading from the cumene production unit to the storage tanks. This may be easily accomplished by means of a metering pump injecting precise quantities of phenol into the cumene line. "In-line" addition of the phenol inhibitor offers obvious advantages over adding the inhibitor to the storage tanks. The cumene is inhibited with phenol before exposure to the atmosphere thereby forestalling the rapid formation of the catalytic cumene hydroperoxide and obtaining the maximum storage stability. Also, the turbulence of the cumene in the pipeline eliminates the need for mixing equipment in the cumene storage tanks.

It is known that cumene having a maximum acid wash color (AWC) of two or less may satisfactorily be employed as a feed stock for the production of phenol and acetone by the cumene hydroperoxide process. The use of my invention maintains the cumene in "on-specification" conditions for extended periods of time as explained below and finds particular use when storing cumene feed stock for the phenol and acetone production process. The Acid Wash Color test (ASTM D848–62) is an extremely sensitive test intended to indicate the content of undesirable unsaturated hydrocarbons in aromatic solvents. The test is performed by shaking the aromatic with sulfuric acid under specified conditions. The color of the sulfuric acid layer is compared with a set of color solution standards and is reported as the number of the nearest matching standard with a plus or minus sign if the sample is darker or lighter, respectively, than the standard. The color scale ranges from 0 (water white) to 14 (concentrated $K_2Cr_2O_7$ solution). A maximum AWC of 2 (light amber) must be maintained during storage of cumene which is to serve as feed for the production of phenol and acetone. This empirical test sets no exact limitation on the allowable percentages of unsaturated hydrocarbons and little is known concerning the components which are particularly unsatisfactory with respect to acid wash color.

In order to evaluate the effectiveness of the phenol inhibition, a test may be employed to measure the concentration of cumene hydroperoxide in the cumene. In this test, the hydroperoxide concentration is measured as the milliequivalents of active oxygen per liter of solution and is reported in parts per million of cumene hydroperoxide. The test is conducted by extracting and reducing the aromatic hydroperoxide with a solution of sodium arsenite which is subsequently refluxed and titrated with iodine to a starch end point. This technique is extremely sensitive for determining low concentrations of hydroperoxide.

The following examples will further illustrate this invention.

EXAMPLE I

This example illustrates the rapid autooxidation of cumene when stored in vented tanks to the extent that it is not usable as an intermediate for phenol production.

Two five-gallon hot-rolled steel test drums, each having a vented top, were cleaned using the following procedure. Each drum was first sand-rolled using clean, dry sand and steel balls and then polished with a commercial nut hull abrasive. This produced a fresh, polished surface in the interior of the drum. All solids were removed from the drum which was then rinsed three times with fresh production grade cumene.

Into each vented test drum, approximately five gallons of production grade cumene having a purity of 99.99 weight percent were introduced. The cumene was sampled and the test drums designated A and B were placed in a room maintained at 110° F. for the duration of the test period. Periodically during the storage tests, the cumene in the test drums was sampled. All samples were tested for AWC and cumene hydroperoxide content (CHP, in p.p.m.) to evaluate the quality of the stored cumene.

The results obtained were:

Table I

| Days at 110° F. Storage Temperature | Test Drums | | | |
|---|---|---|---|---|
| | A | | B | |
| | AWC [1] | CHP [2] | AWC | CHP |
| 7 | 1– | 13 | 1– | 42 |
| 0 | 3+ | 3,160 | 7+ | 1,825 |

[1] AWC = Acid wash color.
[2] CHP = Cumene hydroperoxide concentration in p.p.m.

The method employed of storing the cumene at 110° F. is an accelerated storage test where one week of storage is equivalent to approximately one month's outdoor storage in the Middle Atlantic States area.

These results demonstrate that high purity cumene is subject to air oxidation and is of below standard quality after outdoor storage in vented tankage for one month.

EXAMPLE II

This example illustrates that phenol will increase the storage stability of high purity cumene.

A number of five-gallon test drums identical with those of Example I were cleaned and rinsed as in Example I.

Five gallons of 99.98 weight percent pure cumene were put into each of four of the clean test drums, designated C, D, E and F. Approximately 30 p.p.m. of phenol were added to two of the drums and approximately 100 p.p.m. of phenol to the remaining two drums. After sampling the contents, the test drums were stored in a room maintained at 110° F. for the test period. Samples of cumene were removed from the drums periodically and analyzed for AWC, cumene hydroperoxide and phenol. At the end of seven days, an additional 30 p.p.m. of phenol were added to each of the drums containing the cumene with 100 p.p.m. phenol.

Table II presents the test results:

*Table II*

| Days at 100° F. Storage Temperature | Test Drums | | | | | | | | | | | |
|---|---|---|---|---|---|---|---|---|---|---|---|---|
| | C | | | D | | | E | | | F | | |
| | AWC | CHP | Phenol[1] | AWC | CHP | Phenol | AWC | CHP | Phenol | AWC | CHP | Phenol |
| 0 | 1− | 8 | 28 | 1− | 61 | 27 | 1− | 1 | 91 | 1− | 4 | 100 |
| 3 | 1− | 10 | 23 | 1+ | 61 | 27 | 1− | 6 | 91 | 1− | 9 | 100 |
| 7 | 1− | 10 | 21 | 1+ | 61 | 27 | 1− | 70 | 91 | 1− | 6 | 100 |
| 14 | 1− | | 20 | 1 | 56 | 27 | 1− | 25 | 123 | 1− | 43 | 128 |
| 21 | 1− | | 20 | 1− | 97 | 27 | 1− | 38 | 122 | 1− | 71 | 127 |
| 30 | 1+ | 25 | 19 | 1− | 160 | 27 | 1− | 65 | 123 | 1+ | 175 | 133 |
| 60 | 2 | 525 | 9 | 3+ | 1,025 | 31 | 1− | 225 | 124 | 1− | 395 | 132 |
| 90 | 7+ | 7,200 | | | | | 1− | 165 | 124 | 7+ | 880 | 127 |
| 120 | | | | | | | 2+ | 630 | 125 | | | |

[1] Phenol concentration in p.p.m.

This demonstrates that small quantities of phenol will increase the storage stability of cumene. The oxidation of the cumene to cumene hydroperoxide is inhibited in vented storage periods for approximately eight months where 25–30 p.p.m. of phenol is added and for periods of approximately thirteen months if 125–130 p.p.m. of phenol is used.

EXAMPLE III

This example illustrates that the initial concentration of cumene oxidation products reduces the effectiveness of the inhibiting action of phenol.

Two five-gallon test drums identical to those used in the above tests were cleaned and rinsed as in Example I. After five gallons of 99.98 weight percent pure cumene were added to each of the test drums, approximately 30 p.p.m. of phenol were mixed with the contents of each drum. The cumene used in this test contained more than 150 p.p.m. of cumene hydroperoxide at the time of the phenol addition. The drums designated G and H were stored at 110° F. and sampled as in Examples I and II. Analysis of the samples is presented in Table III.

*Table III*

| Days at 110° F. Storage Temperature | Test Drums | | | | | |
|---|---|---|---|---|---|---|
| | G | | | H | | |
| | AWC | CHP | Phenol | AWC | CHP | Phenol |
| 0 | 1− | 151 | 29 | 1− | 225 | 27 |
| 3 | 1− | 185 | 30 | 1− | 302 | 26 |
| 7 | 1− | 234 | 32 | 1− | 422 | 30 |
| 14 | 1− | 352 | 32 | 2+ | 580 | 23 |
| 21 | 1+ | 448 | 31 | | | |
| 30 | 3− | 1,450 | 34 | | | |

This demonstrates that the presence of cumene hydroperoxide affects the action of the phenol inhibitor; the higher the initial concentration of CHP the less effective is the inhibiting action of the phenol.

Comparing these results with those for test drums C and D, which contained essentially the same amount of phenol, it is seen that the effectiveness of the oxidation inhibition of cumene by phenol is dependent on the extent of cumene hydroperoxide formation at the time of phenol addition. Cumene will remain "on-specification" after a period of over eight months if inhibited with 30 p.p.m. of phenol while the concentration of cumene hydroperoxide is still below 10 p.p.m. This is *twice* the storage time achieved where the hydroperoxide concentration is 60 p.p.m. before the addition of a like quantity of phenol, *three times* that found when the inhibitor is added to cumene containing 150 p.p.m. cumene hydroperoxide and more than *eight times* the permissive period where 225 p.p.m. of hydroperoxide was present before the addition of phenol inhibitor.

Obviously, many modifications and variations of the invention, as hereinbefore set forth, may be made without departing from the spirit and scope thereof and only such limitations should be imposed as are indicated in the appended claims.

I claim:

1. A process for inhibiting the autooxidation of cumene which comprises
    adding phenol to a quantity of cumene wherein the concentration of cumene hydroperoxide in said cumene is less than 75 p.p.m. and wherein the concentration of said phenol in the resulting mixture is between about 20 p.p.m. and about 100 p.p.m.

2. A process according to claim 1 wherein the phenol is added to said cumene subsequent to preparing said cumene having a purity of approximately 99.9 weight percent and prior to contacting said cumene with oxygen.

3. A process according to claim 2 wherein a known quantity of phenol is added to a pipe containing a flowing stream of said cumene.

4. A process of inhibiting the autooxidation of cumene which comprises
    adding phenol to a quantity of cumene wherein the concentration of cumene hydroperoxide in said cumene is less than 10 p.p.m. and the concentration of said phenol in the resulting mixture is between about 20 p.p.m. and about 30 p.p.m.

5. An inhibited cumene which comprises at least 99.9 weight percent cumene, less than 75 p.p.m. cumene hydroperoxide and less than 50 p.p.m. phenol.

6. An inhibited cumene which comprises at least 99.9 weight percent cumene, less than 10 p.p.m. cumene hydroperoxide and between about 20 p.p.m. and about 30 p.p.m. phenol.

References Cited by the Examiner

UNITED STATES PATENTS 1,761,810   6/1930   Bjerregaard _____ 44—78
2,726,999   12/1955  Brandt et al. _____ 260—666.5

OTHER REFERENCES

"Free Radicals," Kirk-Othmer Encyclopedia, 2nd sup., 1960, pp. 351–2.

DELBERT E. GANTZ, *Primary Examiner*.

G. E. SCHMITKONS, *Assistant Examiner*.